3,440,088
COMPOSITION AND PROCESS FOR SURFACE TREATING FLUOROCARBON RESIN
Akira Yamada, Takatsuki-shi, Osaka-fu, and Tsuyoshi Aruga, Mishima-gun, Osaka-fu, Japan, assignors to Daikin Kogyo Kabushiki Kaisha, Osaka-shi, Japan
No Drawing. Filed Oct. 2, 1964, Ser. No. 401,213
Claims priority, application Japan, Oct. 4, 1963, 38/53,407
Int. Cl. B44d *1/22;* B32b *27/06, 9/04*
U.S. Cl. 117—138.8       16 Claims

ABSTRACT OF THE DISCLOSURE

A composition and process for treating the surfaces of fluorocarbon resins in order to improve the ability of such resins to be bonded to each other and to other substrates. The composition comprises 5 to 60% by weight of solid paraffin having a melting point of 30° to 100° C. in a solution of a complex compound formed from an alkali metal and polyaryl hydrocarbon. The composition is preferably used in paste form. The process involves applying the composition to the resin surface and then washing it off.

---

The present invention relates to a surface treating composition and process for improving the adhesion of fluorocarbon resins to themselves or other materials.

Fluorocarbon resins, such as polytetrafluoroethylene, polychlorotrifluoroethylene and copolymers of tetrafluoroethylene with fluorinated olefins having high heat and chemical resistant properties, together with excellent electrical and mechanical characteristics. However, in contrast these characteristics, fluorocarbon resins have extremely poor adhesion to themselves or other materials such as metals, elastomers, synthetic resins and the like, so that adhesives generally used in cementing polymers do not give satisfactory results when employed with fluorocarbon resins.

In accordance with the conventional practice for providing fluorocarbon resins which adhere to themselves or other materials, the most widely practiced procedure is a method in which preliminarily, the surfaces of the fluorocarbon resins are treated with an organic solvent solution of complex compounds of alkali metals and polyaryl hydrocarbons, and the thus treated surfaces are thereafter adhered to themselves or other surfaces by the use of common adhesives such as epoxy resin adhesives, etc.

This conventional procedure, however, involves various shortcomings relative to the matter of handling the aforementioned surface treating agent. Namely, grave disadvantages are involved in handling the surface treating agent in that the effectiveness of the solution of the alkali metal-polyaryl hydrocarbon complex compound as a treating agent is very quickly lost in the presence of oxygen and moisture in the air, and therefore, it must be used under such conditions that air is excluded from it as much as possible by using inert gases such as nitrogen gas, etc., and be stored in an atmosphere of said inert gas. Moreover, it is difficult to obtain said conventional treating agent in the form of a paste.

An object of this invention is to provide a surface treating composition for making surfaces of fluorocarbon resins cementable.

Another object of this invention is to provide a surface treating composition for fluorocarbon resins which is stable in the presence of oxygen and moisture in the air, so that it may be easily used and stored in a stable manner in the atmosphere.

A further object of this invention is to provide a surface treating composition for fluorocarbon resins which is quite stable at normal temperature, so that it may be used not only for the surface treatment of fluorocarbon resins at normal temperature, but also that it may be stored at normal temperatures for long periods of time.

Still another object of this invention is to provide a surface treating composition for fluorocarbon resins which may be used in the form of a paste commodious for transportation and use.

These objects and other objects are attainable, according to the present invention, by admixing paraffins into organic solvent solutions of complex compounds of alkali metals and polyaryl hydrocarbons.

That is to say, the present invention resides in the novel discovery that by means of adding a paraffin to a solution of an alkali metal-polyaryl hydrocarbon complex compound, the resulting composition has a very great stability to oxygen and moisture in the air, so that fluorocarbon resins can be easily treated therewith while exposed to the atmosphere without any reduction of its effect on the fluorocarbon resins being treated therewith.

The solution of alkali metal-polyaryl hydrocarbon complex compound may be prepared by dissolving a polyaryl hydrocarbon in a suitable organic solvent and subsequently adding an alkali metal in metallic form in accordance with the known methods disclosed in such references as: (1) N. D. Scott, J. F. Walker and V. L. Hansley, JACS, 58, 2442 (1936); (2) J. F. Walker and N. D. Scott, JACS, 60, 951 (1938); (3) D. E. Paul, D. Lipkin and S. I. Weissman, JACS, 78, 116 (1956); (4) S. C. Yu and T. L. Chu, JACS, 76, 3367 (1954). The alkali metals suitable for the preparation of the complex compounds are sodium, lithium, potassium and cesium; sodium is particularly preferred because of its commercial availability. As the polyaryl materials to be used to form the complex compound with these alkali metals, polyaryl hydrocarbons such as naphthalene, diphenyl, anthracene, phenanthrene, pyrene, perylene, indene, $\alpha$-methyl naphthalene, $\beta$-methyl naphthalene, acenaphthene, and fluorene, etc., may be used. Among them, the use of naphthalene or anthracene is desirable. The alkali metalpolyaryl hydrocarbon complex compounds can be prepared in, and are generally solube in, specific ethers and tertiary amines such as tetrahydrofuran, dimethyl ether, methylethylether, ethylene glycol dimethylether, dioxane, glycerine trimethylether, ortho ethyl formate, etc., and related ethers as are disclosed in U.S. Patents 2,019,832, 2,023,793, 2,027,000, 2,054,303, 2,119,493 and 2,125,401. The concentration of the complex compound in the solution may be greatly varied. In general, it is, however, desirable that said complex compound is dissolved in the amount of at least about 0.5 mole, and preferably in the range of from 1 mole to 6 moles, in 1 liter of the solvent. In preparing the complex compound in the solvent, accordingly, the alkali metal and polyaryl hydrocarbon are preferably added to the solvent on an equimolar basis and on the order of from 1 mole to 6 moles per liter of solvent.

According to the present invention, it is necessary to use, as the paraffins to be added to the solutions of the complex compounds, solid paraffins having a melting point of preferably from 30° to 100° C., and desirably from 40° to 70° C. With the solid paraffin there may be mixed a liquid paraffin having a melting point of less than 30° C. and in an amount corresponding to less than an equal weight of the solid paraffin, and desirably, in the range of from ⅕ to ½₀ of the weight of the solid paraffin.

The paraffin is added to the complex compound solution, within the range of from 5 to 60 percent by weight, especially from 10 to 40 percent by weight, based on the weight of the entire composition, in order to provide good results; and within this range, the larger is the added amount of the paraffin, the greater becomes the viscosity of the resultant composition, so that a composition having a pasty form can be easily obtained. However, if the amount of the solid paraffin in the solution is under 5 percent by weight, the effect due to the addition of the paraffin is not adequate for the purposes of the present invention; and when the paraffin is added in excess of 60 percent by weight, the effectiveness of the surface treating composition also becomes inadequate.

It is to be noted also that for the purpose of obtaining a composition having a pasty form so as to make the use thereof on the fluorocarbon resin a simple coating operation, there may also be added to the surface treating composition of this invention, in addition to the aforementioned paraffin, various fillers which do not react with metallic sodium and the complex compound, such as polyethylene resin powder, graphite powder, finely ground silica, silicon oxide, the alkali metal salts of various inorganic acids, for example, sodium sulphate, sodium chloride, sodium carbonate, sodium bicarbonate, sodium fluorosilicate, etc.

The treating composition of this invention is applicable to various fluorocarbon resins, for example, polytetrafluoroethylene, polychlorotrifluoroethylene, copolymers of tetrafluoroethylene and hexafluoropropylene, copolymers of tetrafluoroethylene and trifluorochloroethylene, copolymers of trifluorochloroethylene and vinylidene fluoride, copolymers of hexafluoropropylene and vinylidene fluoride, polyvinylfluoride, polyvinylidene fluoride, etc., to enhance their adhesion to themselves or other materials.

To treat a fluorocarbon resin with the treating composition of this invention, it is sufficient to first bring the surface of the fluorocarbon resin being treated into contact with the treating composition of this invention by coating or dipping, and then remove the treating composition by washing, and then dry the treated surface in accordance with well-known methods. The contacting time may be greatly varied according to the concentration of the complex compound. The lower is the concentration, the longer will be the contact time required to obtain the cementable surface. In general, a contact time as short as less than 1 minute is sufficient. The rinsing is preferably made first with an organic solvent such as acetone, then with water.

The bonding process is carried out in the conventional manner after the resin surface treatment as for example wherein the treated surface of the fluorocarbon resin and/or the surface of other material to be bonded therewith are/is coated with a suitable cement and the two surfaces are brought together under such conditions of temperature and pressure as best suited for the type of adhesion cement used. There may be employed various adhesives, such as epoxy resin, polyester or cellulosic cements, although the suitable cement to be used may be selected in accordance with the nature of the specific fluorocarbon resin and the character of bond desired.

The invention is further illustrated by the following examples:

EXAMPLE 1

In 1 liter of tetrahydrofuran, 512 g. (4 mol) of naphthalene was dissolved. To this solution 92 g. (4 mol) of metallic sodium was added, and stirred at room temperature for 2 to 3 hours, and a from black to dark green homogeneous solution was then obtained. To this solution was added 400 g. of a paraffin having a melting point of 46–48° C. which was melted in the solution by heating it at about 65° C., followed by stirring until the system was homogeneous. When this solution was cooled to room temperature, a viscous pasty composition was obtained. With this composition, two kinds of tests, an air resistant property test and a treating effect test were carried out.

In the air resistant property test, the pasty composition was put in a small cylindrical bottle, which was 6 cm. in inside diameter and 4 cm. in depth, to the depth of 2 cm., and the thus filled bottle was placed in a room held at 20° C. temperature and under 65 percent relative humidity, in order to measure the time it took for the composition to completely lose its black color. The sodium-naphthalene solution has a black to dark green color as above-described, and when it is decomposed by moisture or oxygen, it turns pale yellow or colorless. According to this test the composition lost its effectiveness in about 20 days. A contrast was made with the afore-mentioned sodium-naphthalene solution but without the addition of paraffin. The time required for this latter composition to lose its effectiveness was found to be less than 12 hours.

In conducting the test to determine the treating effectiveness of the composition of this invention made in this example the composition was coated on the surface of a film of tetrafluoroethylene resin in a thickness of about 1 mm., and the thus coated film was then placed in the air for about 5 minutes, then rinsed with acetone and water in that order to wash the composition from the film, and the film was then dried. The treated surface of tetrafluoroethylene resin was then coated with an epoxy resin adhesive and cemented to an aluminum plate by heating the composite article for 30 minutes at 100° C. at a pressure of 15 p.s.i.g. A "peel test" indicated that the bonded article had a bond strength of 0.55–0.72 kg./cm. (which was measured by pulling, in a downward direction, the fluorocarbon resin which was adhered to the aluminum plate at a speed of 2 cm./min., using the peel tester "Tensilon UTM–III" manufactured by Toyosokki Co., Ltd., Japan). A comparison test conducted with the afore-mentioned solution but without the addition of paraffin thereto provided a bonded article having a bond strength value of 0.62–0.85 kg./cm.

From the results above described, it is evident that the pasty composition of this invention is superior to the usual sodium-naphthalene solution in the matter of resistance to decomposition in air, and moreover, its bond strength is not substantially interior thereto.

EXAMPLE 2

Into 1 liter of tetrahydrofuran, there was dissolved 178 g. (1 mol) of anthracene, and 23 g. (1 mol) of metallic sodium was added to this solution, which then was stirred at room temperature for 2 to 3 hours to give the standard concentration solution of sodium-anthracene. To this was added 100 g. of a paraffin having a melting point of 46–48° C. which was melted in the solution by heating the entire composition at about 65° C., followed by stirring until it was homogeneous, to thus produce a homogeneous black solution.

When the testing was made with this solution by the same method as described in Example 1, the results were an air resistance value of about 8 days, and a bond strength value of 0.59–0.79 kg./cm.

EXAMPLE 3

To a sodium-naphthalene solution prepared as in Example 1, there were added a liquid mixture which was liquified by heating at about 70° C. of 450 g. of a paraffin having a melting point of 56–58° C. and 50 g. of n-hexadecane, followed by stirring until the system was homogeneous, and a smooth pasty composition was thus obtained. The testings were made with this composition just as in Example 1, the results were an air resistance value of about 17 days, and the bond strength value of 0.58–0.69 kg./cm.

EXAMPLE 4

Into a solution prepared by dissolving in 1 liter of dioxane 640 g. of naphthalene and 115 g. of metallic sodium (both 5 mol), there were admixed 200 g. of a paraffin having a melting point of 40–42° C. which was melted by heating in the solution at about 65° C. and 200 g. of finely ground unhydrated sodium carbonate, followed by stirring until homogeneous, to give a pasty composition. The tests conducted with this composition by the same method as described in Example 1 gave an air resistance value of 7 days, and a bond strength value of 0.56–0.72 kg./cm.

EXAMPLE 5

A sheet of hexafluoropropylene-tetrafluoroethylene copolymer (molar ratio of copolymerization, 1:6) was subjected to a surface treatment using the composition obtained as in Example 1 and by the same method as described in Example 1. The bond strength test was made with this composition by the same method as described in Example 1, and a bond strength value of 0.76–0.84 kg./cm. was obtained.

EXAMPLE 6

Into 1 liter of tetrahydrofuran, there was dissolved 384 g. (3 mol) of naphthalene, and 117 g. (3 mol) of metallic potassium was added to this solution, which was stirred at room temperature for 3 hours, and a from black to dark green homogeneous solution was obtained. To this solution, there was added 450 g. of a paraffin having a melting point of 46–48° C. which was melted by heating in the solution at about 65° C., followed by stirring until homogeneous. When this composition was cooled to room temperature, a viscous pasty composition was obtained.

The bond strength test was made with this composition by the same method as described in Example 1, and a bond strength value of 0.52–0.75 kg./cm. was obtained.

EXAMPLE 7

Into 1 liter of tetrahydrofuran, there was dissolved 534 g. (3 mol) of anthracene, and to this solution there was added 69 g. (3 mol) of metallic sodium, followed by stirring at room temperature for 4 hours, and a from black to green homogeneous solution was obtained. To this solution, there was added 400 g. of a paraffin having a melting point of 42–44° C. which was melted by heating it in the solution at about 60° C., followed by stirring until homogeneous. To this solution, cooled to room temperature, there was added with thorough mixing 150 g. of Glauber's salt ($Na_2SO_4$) which had been previously finely ground, dehydrated, and then dried, and a pasty composition was thus obtained.

When the bond strength was measured with this composition by the same method as described in Example 1, a value of 0.50–0.70 kg./cm. was obtained.

In view of the foregoing, it will be apparent to those who are skilled in the art that there may be made various changes and modifications in the invention without departing from the scope and spirit of the same.

What we claim is:

1. A fluorocarbon resin surface treating composition comprising from 5 to 60 percent by weight of a solid paraffin having a melting point of from 30 to 100° C. in an organic solvent solution of a complex compound of alkali metal and polyaryl hydrocarbon which contains at least 0.5 mole of said complex compound per liter of solvent in said solution.

2. A fluorocarbon resin surface treating composition as in claim 1 wherein the solid parafin has a melting point of from 45 to 65° C.

3. A fluorocarbon resin surface treating composition as in claim 1 wherein the concentration of the solid paraffin is from 10 to 40 percent by weight.

4. A fluorocarbon resin surface treating composition comprising from 5 to 60 percent by weight of a paraffin mixture consisting of a solid paraffin having a melting point of from 30 to 100° C. with less than an equal weight thereof of liquid paraffin having a melting point of less than 30° C. uniformly mixed in an organic solvent solution of a complex compound of alkali metal and polyaryl hydrocarbon which contains at least 0.5 mole of said complex compound per liter of solvent in said solution.

5. A fluorocarbon resin surface treating composition as in claim 4 wherein the ratio of liquid paraffin to solid paraffin is from 5 to 20 percent by weight.

6. A fluorocarbon resin surface treating composition as in claim 1 wherein said solution is one containing from 1 to 6 moles of a complex compound of alkali metal and polyaryl hydrocarbon per liter of solvent in said solution.

7. A fluorocarbon resin surface treating composition as in claim 1 wherein the alkali metal is a metal selected from the group consisting of lithium, sodium, potassium and cesium.

8. A fluorocarbon resin surface treating composition as in claim 1 wherein sodium is the alkali metal.

9. A fluorocarbon resin surface treating composition as in claim 1 wherein the polyaryl compound is a compound selected from the group consisting of naphthalene, diphenyl, anthracene, phenanthrene, pyrene, perylene, indene, $\alpha$-methyl naphthalene, $\beta$-methyl naphthalene, acenaphthene and fluorene.

10. A fluorocarbon resin surface treating composition as in claim 9 wherein the polyaryl compound is anthracene.

11. A fluorocarbon resin surface treating composition as in claim 1 wherein the polyaryl compound is naphthalene.

12. A fluorocarbon resin surface treating composition as in claim 1 in the form of a paste.

13. A fluorocarbon resin surface treating composition as in claim 12 and further comprising a filler which does not react with the alkali metal and complex compound.

14. A method for preparing a fluorocarbon resin surface treating composition which comprises dissolving in 1 liter of organic solvent 0.5 to 6 moles of each of an alkali metal and a polyaryl compound, on an equimolar basis, and then admixing with the resulting solution a solid paraffin having a melting point of from 30 to 100° C. in such amounts as to provide a concentration of said paraffin of from 5 to 60 percent by weight of said composition.

15. A method for treating the surface of fluorocarbon resin which comprises contacting the surface of a fluorocarbon resin with a composition comprising from 5 to 60 percent by weight of a solid paraffin having a melting point of from 30 to 100° C. in an organic solvent solution of a complex compound of alkali metal and polyaryl hydrocarbon which contains at least 0.5 mole of said complex compound per liter of solvent in said solution, rinsing said composition from said surface with organic solvent, rinsing said surface with water, and drying said surface.

16. A fluorocarbon resin treated by the method of claim 15.

References Cited

UNITED STATES PATENTS 2,705,205 3/1955 Sullivan _____ 106—271
2,809,130 10/1957 Rappaport _____ 117—138.8

WILLIAM D. MARTIN, Primary Examiner.

J. E. MILLER, JR., Assistant Examiner.

U.S. Cl. X.R.

106—271; 117—76, 102, 168; 161—189, 218